Nov. 16, 1948.  R. R. HAYS  2,454,058
APPARATUS FOR CONVERTING INTERMITTENT
POWER TO CONTINUOUS POWER
Filed Oct. 19, 1944  2 Sheets-Sheet 2
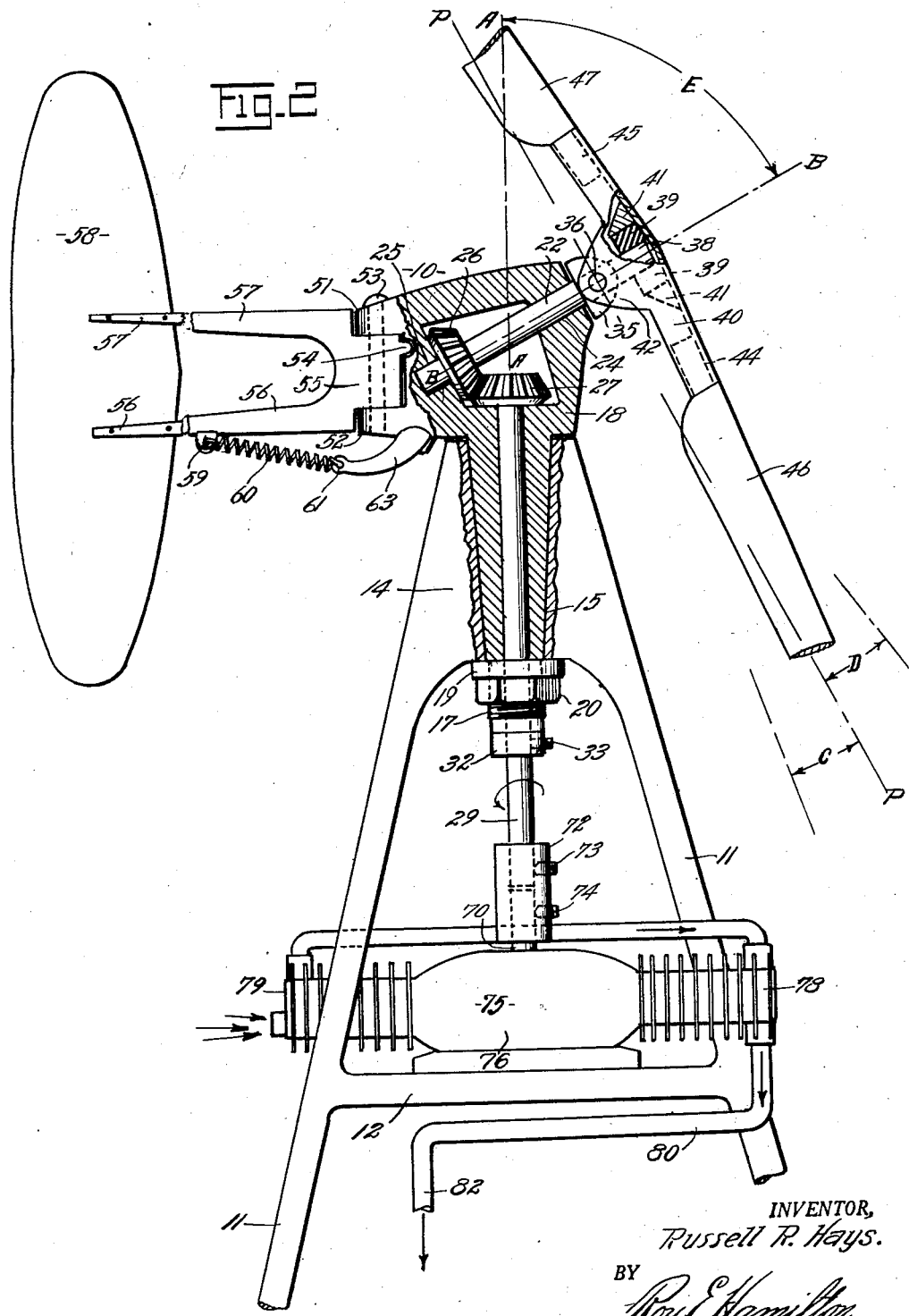
INVENTOR,
Russell R. Hays.
BY
Roy E. Hamilton,
Attorney.

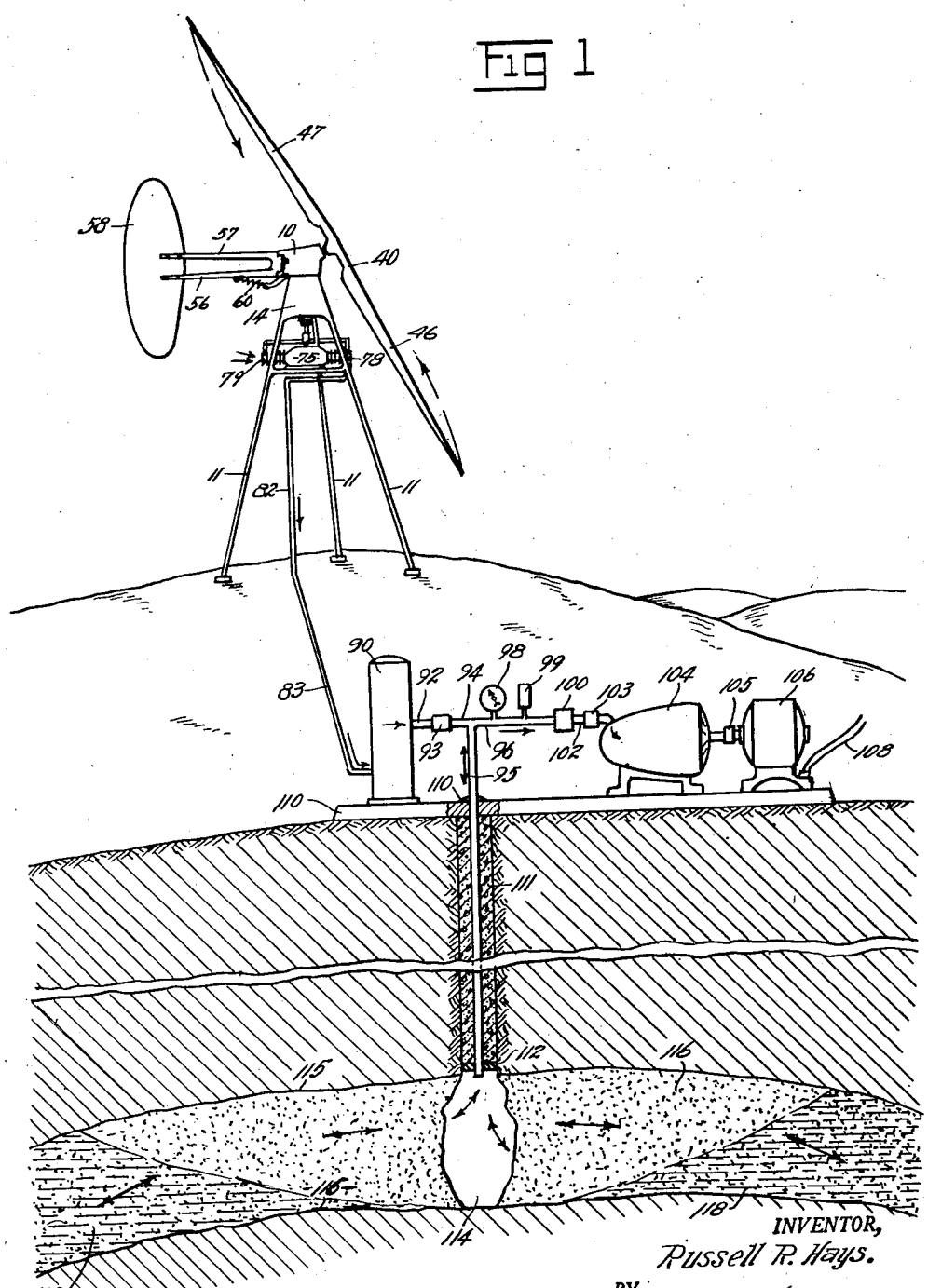

Patented Nov. 16, 1948

2,454,058

UNITED STATES PATENT OFFICE 2,454,058

APPARATUS FOR CONVERTING INTERMITTENT POWER TO CONTINUOUS POWER

Russell R. Hays, Lawrence, Kans.

Application October 19, 1944, Serial No. 559,454

6 Claims. (Cl. 60—57)

This invention relates to method of and apparatus for converting intermittent power to continuous power and more particularly to a process for obtaining continuous energy from intermittent winds; the main elements of which are a giant windmill used to operate a multiple phase air compressor, a subterranean compressed air reservoir in porous water bearing rock, and an air motor operated by an airstream derived from the reservoir.

Large windmills are not widely used at the present time for two reasons. One, air currents are not consistent and therefore the power delivered by the windmill is not continuous. Two, the initial cost and maintenance of large capacity reservoirs for storing the energy thus generated has not justified their installation. Among the reservoirs which may be used are water tanks or ponds lying above the prime mover and providing a hydrostatic head for its operation, battery units for driving motors, and tanks for storing compressed air which may be used for driving air engines.

Smaller windmills for pumping water and charging batteries, on the other hand, are used extensively for the reason that the cost of installation is low and the small capacity reservoirs used are adequate for the purposes served. The utility of large windmills is consequently seen to reside in the development of bigger rotors having a low initial cost in conjunction with the development of large capacity and inexpensive reservoirs for storing the energy generated by them.

In the present invention such utility is provided; first, by adapting the principles incorporated in lifting rotors or propellers to obtain a dependable large span windmill having a low first cost; and, secondly, by utilizing porous water bearing rock strata and lenses lying at relatively shallow depths to obtain sufficient compressed air storage space at no cost other than the initial installation.

Treating these elements individually and in the order of their use, the structural problems arising when the conventional windmill rotor is increased in size have their source in the gyroscopic forces transmitted to the rotor hub with sudden movement of the rotor in response to changes in the direction of the wind; and, the fact that for the mill head carrying a vertically disposed rotor to pivot freely about a vertical pivot carried at the top of the supporting structure, the upper portion of this structure must have substantially vertical sides and hence considerable thickness to provide the necessary structural strength.

Both of these disadvantages are eliminated through the adaptation of rotors having tilting or flapping blades, as for instance the two-bladed rotor illustrated in my co-pending application, Serial No. 494,705, now Patent No. 2,369,048, issued February 6, 1945, for a Drop-center rotor. This rotor is characterized by opposite and interconnected blades being mounted for limited rocking movement about an axis transverse to the rotor's axis of rotation. By reason of this mounting the rotor rocks or tilts about this transverse axis to automatically equalize the air loads effective upon opposite blades, thereby increasing the smoothness of the rotor when operating in yaw. A further advantage of such a yieldable rotor mounting is that with sudden changes in the direction of the wind, the gyroscopic forces arising in the rotor in response to this change are not transmitted directly to the rotor hub, which because of the yieldable nature of the rotor mounting acts to feather the blades with respect to their original plane of rotation thereby providing a corrective rolling moment which more or less nullifies the gyroscopic moment.

Conversion of a lifting rotor to a windmill rotor is achieved by turning the blades over and increasing their pitch. Several such conversions have been made and the rotors tested as windmills. In this testing, a pertinent fact uncovered was that the drop in efficiency when the rotor's plane of rotation was tilted from the vertical to as much as 30° to the vertical was surprisingly small. The direct application of this finding was that such rotors could be mounted at the apex of a pyramidal tower, thereby reducing the structure required to support the mill to about one-fourth that required for the same rotor when operated in a vertical plane. An added advantage was that with the rotor hub positioned close to the vertical head pivot, it was now feasible to use a conventional vane and coiled spring for pulling the rotor into the wind, and for automatically decreasing its attack angle to the wind in response to marked increases in the velocity of the latter.

Gearing the rotor to drive a multiple phase compressor mounted in the top of the supporting tower and piping of the compressed air to an input well follows accepted procedure. Selection and preparation of the underground storage reservoir, however, calls for special consideration. At the present time, compressed air is used for driving oil in stripper fields, and gas under pressure is forced back into abandoned gas fields for storage. While the process is broadly similar to these, the development of porous water filled strata lying at relatively shallow depths as compressed air reservoirs is in no sense competitive with either. To begin with, oil and gas fields suitable for repressuring are rarely found at depths less than 500 feet, and most of them lie considerably deeper. The original nature of these reservoirs also prevents their use for compressed air storage, the retained gases being capable of producing an explosive mixture, and with stripper fields migration of oil to lower pressure areas prevents maintenance of the input pressure.

For efficient compressed air storage the strata used will preferably lie between 200 feet and 500 feet beneath the surface. At these depths surface structure is usually rather well reflected in sedimentary rocks so that it is not particularly difficult to locate the high point of small domes or to choose strata lying level. Although individual sand lenses may be used for air storage, a highly porous strata of sandstone or limestone containing either water or brine is highly preferable. The reason is that water forced out of the domes or away from the input well in a level strata exerts its original hydrostatic head against the imput air to maintain a substantially constant pressure within the reservoir, as opposed to the pressure gradient resultant to filling of a closed container.

The use of highly porous and fluid flanked reservoirs which will provide a more or less continuous pressure of the stored air regardless of its volume is of primary importance as regards the efficiency of the windmill. This is because the prevailing winds vary greatly in their intensity, and it is desirable to utilize them through as wide a range as possible. Hence if the input pressure required increases markedly as the reservoir fills, it follows that the starting torque required to overcome this pressure will increase by a like amount and consequently the mill would cease to operate in slower winds unless a complicated gear shift mechanism were incorporated in the gearing.

The use of relatively shallow artesian formations is also desirable since the compression of air becomes mechanically more difficult at higher pressures, requiring heavier and more expensive compressors. This involves an increase in the initial outlay as does the drilling and equipping of deeper wells.

The depth of a well is not in itself the determining factor in its suitability as a reservoir, although in most localities it is indicative of the minimum working pressure available. This latter is dependent upon the bottom hole pressure of the water in the drill hole. This pressure is determined by the distance the water rises above the porous strata when drilled into. Hence if at a depth of 200 feet a water sand is encountered and the water rises quickly to within 50 feet of the surface, its bottom hole pressure is in the neighborhood of 65 pounds. In short, the air pressure required to drive the water away from the drill hole will need to be greater than this.

The next factor to be considered is the permeability of the formation. This is initially increased by shooting or acidizing the drill hole to increase the drainage face. Beyond this point it is predetermined largely by the porosity of the strata, and is the factor limiting the rate of withdrawal from the reservoir. This rate is readily determined by pumping air into the reservoir and taking pressure readings at the well head as an escape valve passing through a gas meter is slowly opened. When the pressure, in the instance cited, begins to drop below 65 pounds, the natural rate of the reservoir is being exceeded, and to withdraw air more rapidly represents a loss in efficiency due to the limited porosity of the rock.

This natural rate of the reservoir is also reflected by an increase of the input pressure above 65 pounds as the rate of input is increased. It becomes evident therefore that the size of the compressor and windmill unit which can be used most advantageously with any natural reservoir is limited by this factor. The point to be made is that for family use or small communities, there are numerous shallow rock reservoirs having a high enough natural rate to make their use economically practical for supplying continuous power when used in conjunction with windmill powered compressors.

Accordingly, the object of this invention is broadly to provide a dependable windmill of larger span than those commonly used for the purpose of forcing compressed air into a natural rock reservoir, from which it may be withdrawn continuously at a constant rate and pressure for the operation of an air engine or other air operated machinery.

Another object is the provision of an improved rotor for a windmill which is mounted for limited rocking about an axis transverse to its axis of rotation.

Yet another object is the provision of a windmill rotor of large size mounted for limited rocking about an axis transverse to its axis of rotation, in which the axis of rotation is tilted up through an angle of about 30° to the horizontal in order that the rotor may be mounted at the apex of a pyramidal tower and at the same time have adequate clearance with respect to the legs of this tower.

Another object is the provision of a multiple phase compressor geared directly to such an improved rotor, a line for cooling and conducting the compressed air through a filter for removing dust and other foreign material, a check valve on the line intermediate the filter and the input tubing leading to a porous rock structure.

Another object is the provision of a subsurface air reservoir in a porous strata initially filled with water, an air line leading from this reservoir to the surface where it is fitted with a regulator and restricted orifice permitting a continuous flow of air from the reservoir at the latter's natural rate to drive an air engine or other air activated mechanism.

Ancillary objectives such as the use of a conventional vane governor to automatically throw the rotor into and out of the wind, the use of safety valves on the air line to prevent heaving of the rocks lying between the reservoir and the surface, and other accessories to the process used will become clearer from reading the following description in conjunction with the accompanying drawings in which:

Figure 1 is a diagrammatic sketch showing the plan of installation of a windmill and subsurface reservoir unit such as that embodied in this invention, and Figure 2 is an enlarged view in side elevation of the rotor head and compressor of the windmill shown in Fig. 1, with parts partly broken away.

Referring to the figures, the windmill 10 has a tower with legs 11 forming a pyramidal structure topped by the head member 14 which contains concentrically disposed bearing seats 15 in which the lower extension 17 of the mill head 18 is mounted for free turning movement about a vertical axis A—A, being retained in the head member 14 by means of adjustable nut 29 and washer 19. The mill head 18 forms a case carrying the rotor drive shaft 22 in bearings 24 and 25 in a canted position relative to the horizontal in which its axis of rotation B—B intersects the vertical mill head axis A—A and makes an angle E of approximately 60 degrees with it.

The inner end of the rotor shaft 22 carries the driving gear 26 which meshes with the compressor gear 27 carried on the shaft 29 concentrically disposed within the mill head extension 17 where it is retained by lock bearing 32 having setscrew 33. The outer end of the shaft 22 carries the rotor hub mounting 35 in which are fixed transverse rocking pins 36 upon which the rotor hub 40 is mounted by means of transverse bearings carried in the hub extensions 42. The hub 40 is made of slightly yieldable material such as spring steel and the blades 46 and 47 mounted on it by butts 44 and 45 respectively are pre-coned so that the center of mass of the rotor lies substantially on the rocking axis carried by pin 36. Otherwise the plan of the blades follows conventional practice either as regards windmills or lifting rotors as is described more in detail in said Patent No. 2,369,048 for a Drop-center rotor. Rocking of the rotor about the pin 36 is limited to movement through angles C and D of plus and minus 10° approximately to the rotor's mean plane of rotation P—P by means of brackets 41 in the bottom of the hub structure 40 which carry resilient pads or dampers 39 which loosely contact the rotor shaft extension 38 when the rotor operates in plane P—P.

The back end of the mill head 18 extends as brackets 51 and 52 carrying the vertical pin 53 upon which is mounted the nose piece 55 of the vane 58. Arms 56 and 57 of the nose piece extend away from the mill head to carry the vertically disposed vane 58. The stop 54 at the front of the nosepiece 55 prevents swinging of the vane out of a vertical plane in alignment with the axis B—B in one direction, and the coiled spring 60 mounted on bracket 59 carried by the vane arm 56 and bracket 61 carried by the arm 63 extending laterally from the millhead, provides a spring tension preventing the vane from swinging out of alignment in the other direction. This is the ordinary spring governor for windmills, the torque created by the rotor tending to turn the mill head in a direction opposed to the tension of spring 60, and out of the wind, whereas the vane exerts a tension on the spring 60 tending to pull it back into the wind.

The vertical drive shaft 29 which extends downward from the mill head gear box is coupled to the crankshaft 70 of the multiple phase compressor 75 by means of coupling 72 carrying set screws 73 and 74. The crankcase 76 of the compressor is solidly affixed to the cross-members 12 of the mill tower 11, and has at least two cylinders, one of which 79 compresses the air in the first stage, and the other 78 in the second phase as is well known in the art. A conduit 80 connects the exhaust port of the cylinder 78 with the air line 82 which extends down to the ground into ground line 83 which feeds into the filter or washer 90 adjacent the input well 110. The outlet line 92 from the filter 90 carries the check valve 93 which allows down-well movement of the air from the filter but prevents its return, consequently the air from the compressor passes from the check valve 93 into the well tubing 95. Tubing 95 extends down into the drill hole and into the shot hole 114 of the porous strata of the reservoir. Just above the shot hole a plate packer 112 fills the drill hole and provides a seat for solidly fixing the input tubing 95 into the drill hole by cement 111.

The upper end of the input tubing 95 continues into the line 96 carrying the pressure guage 98 and the safety valve or pop-off 99 which is set to open when the pressure in the line becomes approximately twice that of the rock pressure of the strata being used as a reservoir, thereby preventing any danger of heaving. The end of the line 96 passes into the pressure regulator 100 which is set approximately at the reservoir's initial bottom hole pressure, and the outlet line 102 passes through the choke or reduced orifice 103 which reduces the volume to the natural rate of the input well or less depending upon the requirements of the installation before the air passes into the air turbine 104 which drives the generator 106 through the coupling 105 to provide a continuous flow of electricity into lines 108.

In operation the rotor 40 is unbraked by the release of a conventional brake and throwout mechanism (not shown) whereupon the vane 58 acts to swing it into a position transverse to the relative airstream. Upon being turned by the wind it supplies a torque through the gears 26 and 27 and shafts 22 and 29 respectively to the compressor 75. The compressed air from the compressor passes through the various accessories and down the input line 95 to the face of the shot hole 114 in the porous strata 115. Since the pressure of the compressed air is greater than the bottom hole pressure exerted by the water in the formation it has the effect of forcing the water away from the drill hole and replacing it in the small openings thus vacated. A large number of factors have bearing upon the rapidity with which this can be done, and consequently the normal rate of every reservoir will vary. Where water filled gravels comprise the strata used, this rate will be very high, whereas with fine grained silts or sandstones it will be relatively low.

The same factor will control the rate of up-dip migration of the air in the strata in cases where small domes are not used as reservoirs. The general picture, however, is one of air replacing water in the porous strata 115, and driving back the water into the flanks 118. Since the surface drainage of such a strata normally extends over a very great area relative to the volume of the reservoir, this drainage lying approximately at the height to which the water initially rises in the drill hole, very little permanent migration of the water can occur, this being illustrated by heavy pumping of wells in such strata having no permanent effect in lowering the water level of the formation. As these wells refill when pumping is discontinued, in a like fashion the hydrostatic head of the water at the flanks of the reservoir acts to drive the air back into the line 95.

The general principle involved is consequently seen to be one of the rate of input from the compressor into the reservoir being many times greater than the rate of withdrawal through the regulator 100 and reduced orifice 103. Consequently, once the persistency and velocity of the prevailing winds in any locality is known, it becomes possible to estimate with reasonable accuracy the reservoir capacity required to supply a continuous airstream to the air engine 104 at the natural rate of the reservoir or less, and accordingly these factors will dictate the maximum windmill installation required.

Numerous adaptation and changes may be made in the relative size and arrangement of parts without departure from the general nature of the process described.

Having thus described the invention, what I claim as new and desire to be secured by Letters Patents is:

1. In combination, an air compressor driven by a varying source of power, a conduit connecting said compressor with a subsurface water bearing porous rock strata adapted to receive compressed air from said air compressor and to exert a hydrostatic pressure on said air whereby the density of said air remains substantially constant, and a pressure controlled conduit communicating with said porous rock strata whereby a substantially even flow of energy is maintained therefrom.

2. In combination, an air compressor driven by a windmill having a rotor mounted for limited rocking movement about an axis transverse to the rotor's axis of rotation, a subsurface compressed air chamber situated in a porous water bearing strata adapted to receive compressed air from said air compressor, a motor, and a pressure controlled conduit whereby a substantially even flow of energy is delivered from said subsurface compressed air chamber to said motor.

3. Hydraulic means for converting the energy of intermittent winds to continuous power, comprising in combination with a wind rotor operatively associated with an air compressor, a conduit connecting said compressor with a sealed artesian reservoir, and a restricted constant pressure outlet from said conduit intermediate said compressor and said reservoir.

4. Hydraulic means for converting the energy of intermittent winds to continuous power, comprising in combination with a wind rotor operatively associated with an air compressor, a conduit connecting said compressor with a sealed artesian reservoir, and a restricted surface outlet on said conduit opening into a regulator maintaining the outlet line pressure slightly below that of said reservoir, whereby said reservoir supplies a continuous airstream to said restricted outlet at those times when the wind rotor is not operating said air compressor, and at substantially the same pressures as when said compressor is in operation.

5. Hydraulic means for converting intermittent power to continuous power, comprising in combination with an intermittent source of power, an air compressor operatively associated therewith, a conduit leading therefrom and communicating with a sealed artesian reservoir, pneumatic means including an airstream compressed to pressures in excess of the reservoir pressure for forcing the contained fluid away from the conduit opening to said reservoir, hydraulic means including the natural hydrostatic head of said contained fluid for driving said pneumatic means back into said conduit in response to pressure reduction therein, and a restricted constant pressure outlet on said conduit for supplying a continuous high pressure airstream.

6. Hydraulic means for converting intermittent power to continuous power, comprising in combination with an intermittent source of power, an air compressor operatively associated therewith, a conduit leading therefrom and communicating with a sealed artesian reservoir, pneumatic means including an airstream compressed to pressures in excess of the reservoir pressure for forcing the contained fluid away from the conduit opening to said reservoir, hydraulic means including the natural hydrostatic head of said contained fluid for driving said pneumatic means back into said conduit in response to pressure reduction therein, and a restricted constant pressure outlet from said conduit for supplying a continuous high pressure airstream, whereby an air engine is operated continuously.

RUSSELL R. HAYS.

REFERENCES CITED

The following references are of record in the file of this patent:

UNITED STATES PATENTS

| Number | Name | Date |
|---|---|---|
| 254,303 | Gering | Feb. 28, 1882 |
| 320,482 | Leavitt | June 23, 1885 |
| 543,462 | Bramwell | July 30, 1895 |
| 607,151 | Wichmann | July 12, 1898 |
| 1,035,431 | Ericson | Aug. 13, 1912 |
| 1,679,417 | Garnier | Aug. 7, 1928 |
| 2,116,023 | Gwidt | May 3, 1938 |
| 2,369,048 | Hays | Feb. 6, 1945 |

FOREIGN PATENTS

| Number | Country | Date |
|---|---|---|
| 601,536 | Germany | Oct. 1, 1934 |